United States Patent
Riva et al.

[11] Patent Number: 5,914,883
[45] Date of Patent: Jun. 22, 1999

[54] METHOD FOR CONTROLLING A MACHINE TOOL, IN PARTICULAR AN EDM MACHINE

[75] Inventors: Luciano Riva, Via Monte Cimolo, Italy; Renzo De Maria, Bellinzona, Switzerland

[73] Assignee: AG fur industrielle Elektronik AGIE Losone bei Locarno, Switzerland

[21] Appl. No.: 08/833,870

[22] Filed: Apr. 10, 1997

[30] Foreign Application Priority Data

Apr. 10, 1996 [DE] Germany .......................... 196 14 202

[51] Int. Cl.⁶ ....................................... G06F 19/00
[52] U.S. Cl. .................. 364/474.23; 219/69.17; 364/474.04
[58] Field of Search .................. 364/474.01, 474.04, 364/474.23, 474.24, 191, 192, 193, 188, 189, 468.03; 707/103; 219/69.11, 69.17

[56] References Cited

U.S. PATENT DOCUMENTS

| 5,208,765 | 5/1993 | Turnbull ................................. 364/552 |
| 5,453,592 | 9/1995 | Takeuchi et al. ..................... 219/69.17 |
| 5,453,933 | 9/1995 | Wright et al. ....................... 364/474.23 |
| 5,499,365 | 3/1996 | Anderson et al. ............. 364/474.24 X |
| 5,506,787 | 4/1996 | Muhlfeld et al. ............... 364/474.24 X |
| 5,526,273 | 6/1996 | Borsari et al. ...................... 364/474.22 |
| 5,552,995 | 9/1996 | Sebastian ........................... 364/474.24 |

FOREIGN PATENT DOCUMENTS

| 0 663 257 A2 | 7/1995 | European Pat. Off. .......... B23H 7/04 |
| 0 663 257 A3 | 7/1995 | European Pat. Off. .......... B23H 7/04 |
| 41 05 291 A1 | 2/1991 | Germany ......................... G06F 15/46 |
| 41 05 291 C2 | 2/1991 | Germany ......................... G06F 19/00 |

OTHER PUBLICATIONS

Excerpt—"Object–Oriented Programming Reusing and Reprogramming NC Programs" by Walter Eversheim; 1991.

*Primary Examiner*—Joseph Ruggiero
*Attorney, Agent, or Firm*—Gifford, Krass, Groh, Sprinkle, Anderson & Citkowski, P.C.

[57] ABSTRACT

A method and a device for controlling the entire machining operation of machine tools, in particular EDM machines, whereby the entire machining operation is broken down into individual machining objects, such as workpiece, work step etc., and the current machining status of the machining object is monitored before, during and/or after the entire machining operation and is displayed as needed.

6 Claims, 3 Drawing Sheets

METHOD FOR CONTROLLING A MACHINE TOOL, IN PARTICULAR AN EDM MACHINE

FIELD OF THE INVENTION

The invention pertains to a method and to a device for controlling a machine tool, in particular an EDM machine.

BACKGROUND OF THE INVENTION

Machine tools of this kind usually have a numeric control, e.g., an NC or CNC control. The control data, such as position and/or path or contour data for the desired workpiece machining needed for the numeric control, are supplied in the form of control inputs to the control device and are converted there into control signals for servo drives of the machine tool.

As one example for this, we mention an EDM machine, i.e., an erosive die sinking or cutting machine. These EDM machines are used, for example, for the manufacture of stamps and/or dies of conducting materials. The extremely high machining precision is an advantage. An economically rational usage of these EDM machines consists primarily in the production of molds for mass production. This yields the need during standard operation of the EDM machine to input the individual control data applicable to the particular workpiece, before the machining of one or several workpieces. In addition to the assignment of the desired machining steps, possible accidents must also be taken into account, e.g., a wire break during cutter eroding, i.e., situations during the machining in which the operator must intervene manually in the machining sequence. The control device thus stops the machining sequence until receipt of a Continue command from the operator, and prompts the operator to remove or to attach a "dropout piece," for example, such as is produced when cutting a die, or a stamp, to change a tool, etc. The following two process interruptions can thus be distinguished: the planned, predictable interruption, e.g., tool change, dropout piece fastening or removal, and the unpredictable interrupt, e.g., wire break, short circuit, etc.

When preparing the machine tools for a new machining sequence, the so-called set-up, the machine operator must thus program for the predictable interrupts or "breaks," when the machining sequence stops, and the machine awaits additional instructions from the operator. With increasing complexity of the workpiece machining on modern machine tools, e.g., three-dimensional eroding with an EDM machine, it will be increasingly more difficult for the machine operator to understand which processes have been already completed in the overall machining operation, and where the machining sequence is currently located.

Control methods of the aforesaid type corresponding to the state of the art require control inputs in the form of completed "programs," so-called sequential control programs. A program of this type includes all control data and specifies which cutting paths, for example, are to be performed with which quality at which location on the machined workpiece and in which sequence, etc. The control data are specified in a sequential series of commands. Thus, a command corresponding to a particular process step remains active until it is replaced by a new command for a new machining step in the command sequence of the control program. If an unforeseeable accident occurs in this sequential machining, then the control device stops the entire machining operation sequence and waits for an input by the operator. For example, machinery running overnight can be stopped relatively early in the machining sequence in case of an accident. After correcting the accident, the part of the machining can only be continued on the following day, which is a disadvantage. Control devices of this type thus have undesirable down times and do not operate sufficiently economically.

SUMMARY OF THE INVENTION

The present invention is intended to improve machine tools, in particular EDM machines with regard to their ease of use and machining economy.

In the invented method to control machine tools, the entire machining operation on the machine tool is divided into individual machining objects, such as workpiece, workstep, etc., and the current machining status of the machining object is monitored before, during and/or after the overall machining operation and is displayed as needed. If the operator has input all or a few selected work steps—which are to be carried out on at least one object—into the machine tool, then the overall machining operation will be started. With the invented method and/or the invented device the operator can now easily track the machining status of each machining object by means of a suitable display device and intervene in the machining sequence as necessary.

The control method according to this invention can take account of events affecting a machining object during operation. These events can be indicated to the operator after completing the overall machining operation, so that the operator can discern, on the basis of the machining state of the individual machining objects, precisely which events have occurred during the overall machining operation.

Preferably, the operator can change the machining status of a machining object in any manner and at any time, i.e., both before the start of the overall machining operation, and also during and/or after a machining stop; for example, the operator can select the change from a given list of suitable states. Thus a preselection of suitable states can be made for a particular machining object, said states are determined, for example, from the machining states of other subordinate and/or higher-order machining objects, and are displayed to the operator as necessary.

Preferably the list of states of a machining object is configured as a so-called "open" list. The machine operator can thus add additional possible states to the list, as needed, and define individual behavioral patterns for exceptional situations. This has the advantage that operational know-how with regard to certain working steps etc., can be taken into account and the control device can be permanently adapted to this.

It is a particular advantage if the machining objects are subdivided in a hierarchial manner in order to enable the operator easily to find individual work steps of the workpiece machining. The hierarchial structure of the machining objects has the added advantage that the states of the machining objects preferably influence each other. For example, if the state of a specific machining step has been set to the "In process" state, then the control device also sets the state of the higher-order machining objects, such as machining group, of the higher-order workpiece, etc., to the same state. Thus the operator will be informed directly of which workpiece still requires additional machining.

The actual or overall machining operation, i.e. the sequence of the work steps to be executed, is determined under consideration of the following criteria: with a specified machining strategy, i.e., a definition of whether all separating cuts for dropout pieces are to be cut as early as possible or as late as possible during the overall machining operation, and/or by issue of certain priorities for individual machining objects, i.e., whether certain work steps are to be carried out before or after other work steps.

In some embodiments, the control device according to the invention is equipped with a memory management device to manage the machining operation in the form of individual machining objects, such as workpiece, work step, etc., a monitoring device to monitor the current machining status of a machining object, and a display device to display, as needed, the current machining state of a machining object, before, during and/or after the entire machining operation.

In summary, in contrast to known control methods, individual machining steps are no longer viewed in isolation and joined together in an inflexible sequence of machining steps, but rather they are described in an object-oriented manner as separate machining objects. The sequence of overall machining operation is thus entirely flexible and can be easily changed at any time without cumbersome reprogramming. The control device monitors all machining states, and takes into account the effects of a change of state of one machining object on the machining state of the other machining objects.

By simply selecting a certain machining strategy and by the optimum display of the machining states of the individual machining objects on the display device, it is possible for the machine operator to set up an individual machining sequence in a simple manner and to check and change it, if necessary, directly on the display device.

In an analogous manner, if necessary, the machine operator can insert "new" machining objects for the machine tool and thus supplement the already existing object structure. In this manner, a new machining object can be included in the object structure of the machine control and can be used for future machining in the invented manner.

BRIEF DESCRIPTION OF THE DRAWINGS

Preferred designs of the invention will be described in greater detail below with reference to the drawings. These drawings show.

DETAILED DESCRIPTION OF THE PREFERRED EMBODIMENTS

The invention will be explained below based on an erosive cutting machine. However, this is not intended to limit the invention in any way, since the uses in machine-tool technology are very wide-ranging.

An erosive cutting machine of this type regularly has a CNC controller which controls the relative motion between workpiece and wire electrode determining the cut contours as needed for workpiece machining. In this case, an X/Y-drive is provided and this drive can move in the direction of the main X/Y-axis and is coupled with the workpiece table and the drive receives the control signals of the CNC controller. The CNC controller requires a control program which contains the control data, such as position data of one or more workpieces clamped to the workpiece table, profile or contour data of the desired cut contours, etc., and converts it into control signals for operation of the X/Y-drive.

Figure 1:
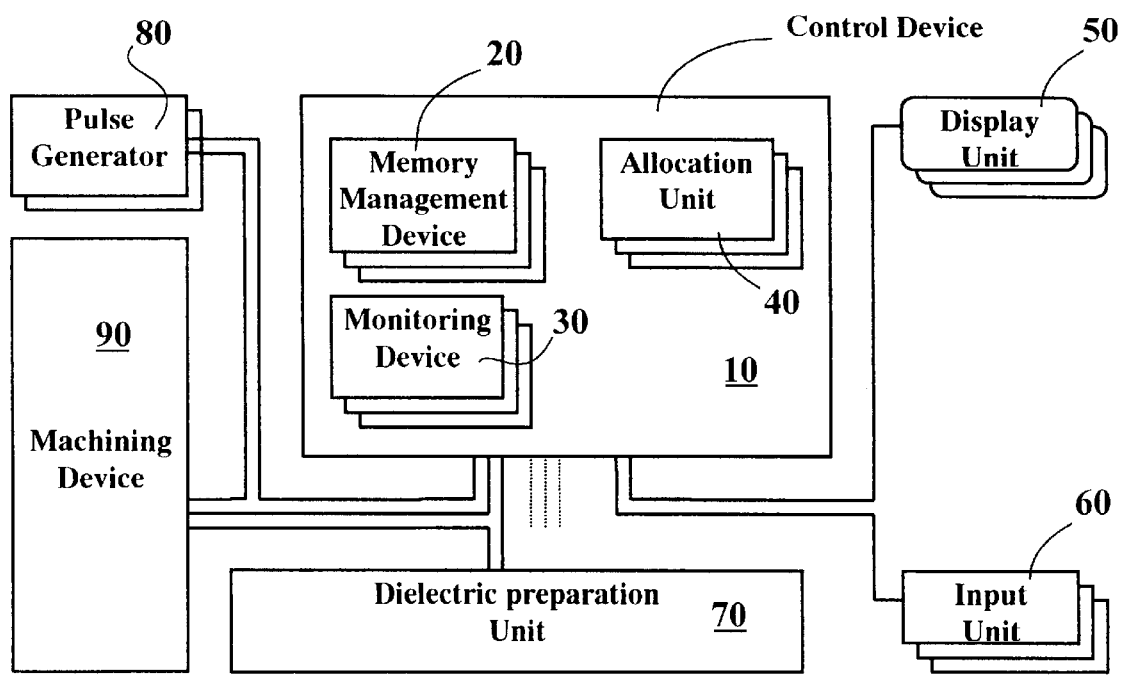
FIG. 1, the components of the control device of an erosive cutting machine.

One example of a hardware implementation of the control device according to this invention is shown in FIG. 1. A control device 10 is composed of a memory management device 20, which permanently stores the overall object-based machining in the form of individual machining objects with associated machining states. Furthermore, it is composed of a monitoring device 30 which monitors the current machining state of a machining object, and an allocation unit 40, which can determine the machining state of a machining object automatically and assigns the states to it. The control device 10 has a display unit 50 and an associated input unit 60 of a graphical user interface. In the case of the present erosive cutting machine, the control device 10 is connected to a dielectric preparation unit 70, with a pulse generator 80 and also the machining device 90. All the devices presented above 20, 30, 40, 50 and 60 can also be present more than once.

The file management of the CNC controller is divided into various, hierarchically echeloned management levels, hereinafter called "working levels." Every working level of the CNC controller is composed of one or more machining objects on the erosive cutting machine. For instance, the memory management device 20 shown in FIG. 1 manages the following administrative levels: Machine level, level of the work table of a pallet, (of a group of workpieces,), of a workpiece requiring special machining, etc. A flexible object structure of this type is useful for a number of complex, single machining steps or work steps. The grouped machining objects can be managed according to a specified, hierarchial order which can be set up by the machine operator himself, if necessary.

Figure 2:
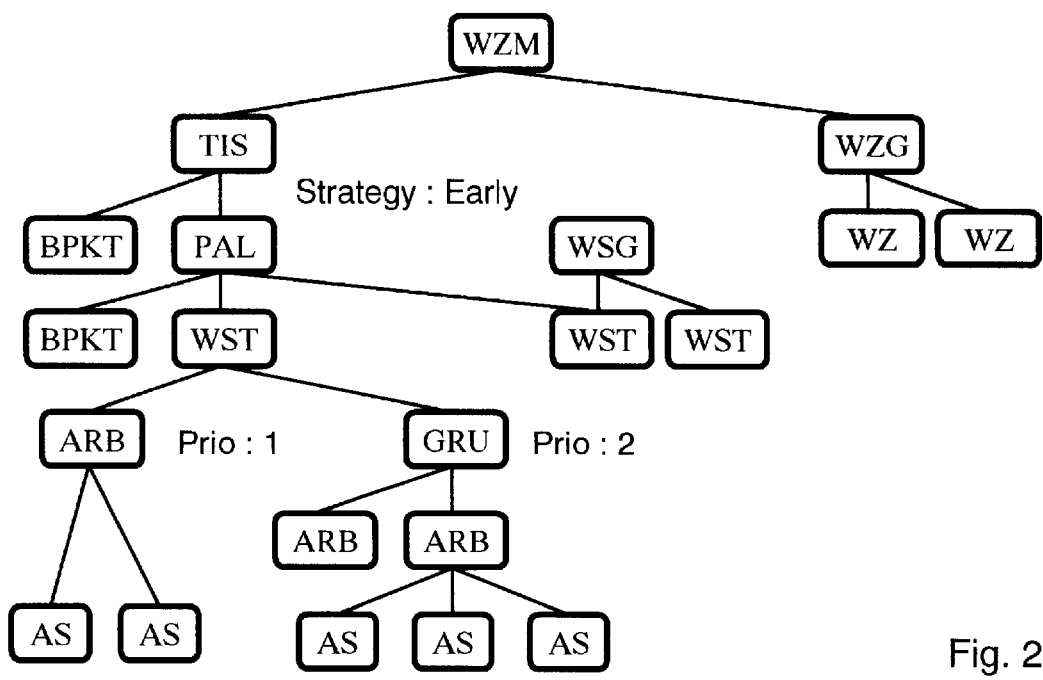
FIG. 2, an example of hierarchial overall machining operation, divided into differing machining objects, on an erosive cutting machine FIG. 3 a sample list of suitable machining states for the machining objects shown in FIG. 1.

FIG. 2 shows an overall machining operation setup divided hierarchically into different machining objects. The machining object at the top of the hierarchy is the machine tool "WZM." The machine tool "WZM" has an associated work table "TIS" and a tool group "WZG" with subordinate tools "WZ". This structure is suitable for any highly automated machine tool, in particular for erosive cutting machines with an automated tool and workpiece infeed. A pallet "PAL" and a reference point "BPKT" for the work table are subordinated to the work table "TIS"; in turn, the "PAL" is subordinated to a reference point "BPKT" and two workpieces "WST." A workpiece group "WSG" consists of a subordinate workpiece "WST" of the above mentioned pallet "PAL" and an additional subordinate workpiece "WST". From this it is evident not only that the hierarchy must have a downward expanding tree structure, but also that hierarchies with ancillary starting objects (without higher-order object) can be set up (the workpiece group machining object "WSG" is associated here with the pallet machining object "PAL"). For example, a workpiece group "WSG" can be composed of the workpieces of different pallets "PAL." On this example it is clear that the operator can prepare any particular structure of administrative levels which appears to him to be the optimum programming effort for the overall machining operation.

A machining group "GRU" and a machining operation "ARB" with two subordinated work steps "AS" are subordinated to the workpiece "WST" illustrated on the left in FIG. 2. A first machining operation "ARB" and a second machining operation "ARB" consisting of three work steps "AS" are in turn subordinated to the machining group "GRU."

Figure 3:
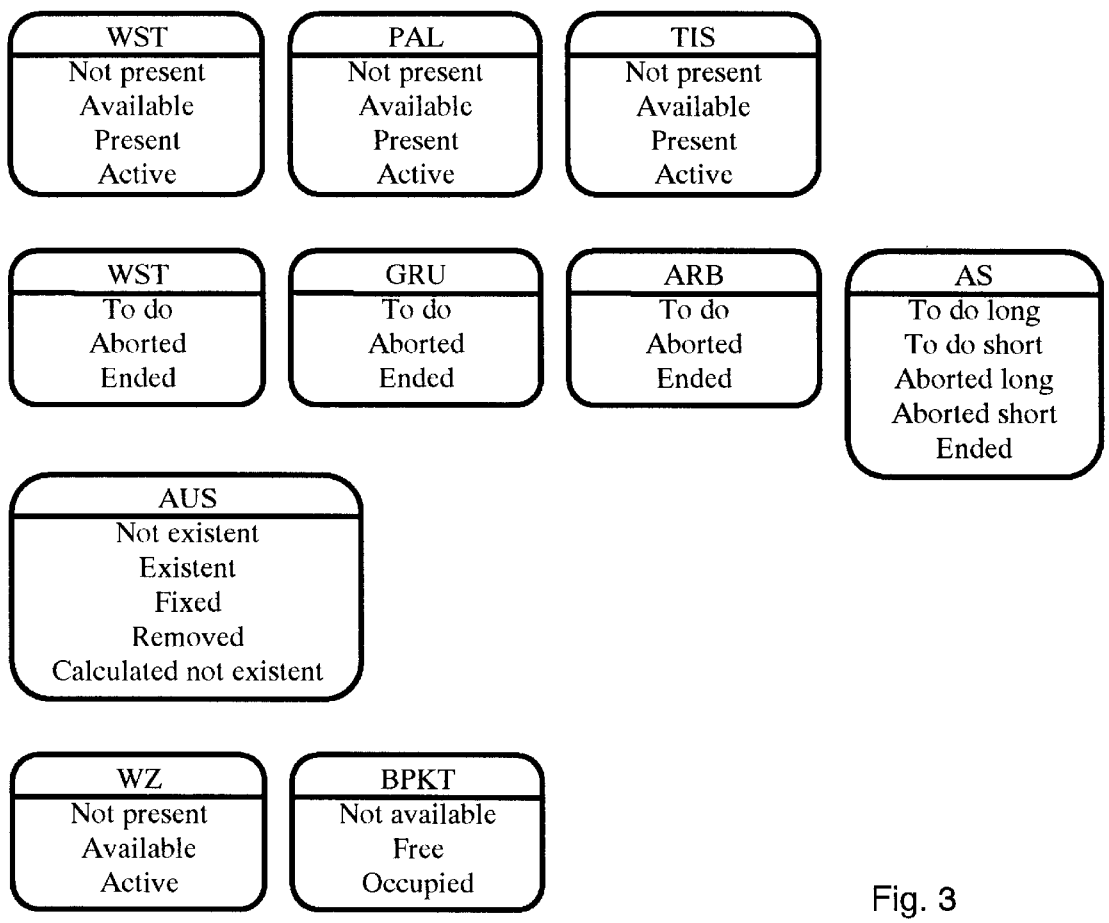

As an example, FIG. 3 shows a list of suitable machining states for the individual machining objects shown in FIG. 2. The machining objects machine tool "WZM," pallet "PAL" and work table "TIS" can take on the states, "not present," "available" "present" and "active," the machining objects workpiece "WST," workpiece group "GRU" and machining operation "ARB" can take on the states "to do," "aborted" and "ended". A single work step "AS" as machining object can have the states "to do, long," "to do, short," "aborted long," "aborted short" and "ended" (see below). The machining object dropout piece "AUS" (see below) has the states of "not existent," "existent," "fixed," "removed," "calculated not existent." The machining objects, tool group "WZG" and tool "WZ," can have the machining states "not present," "available" and "active," the machining object reference point "BPKT" has the machining states of "not available," "free," and "occupied."

When setting up the erosive cutting machine, the operator selects a certain machining object, e.g., the work group "GRU." The allocation unit 40 searches through the memory management device 20, then for the machining states suitable for the working group "GRU" and outputs them in a window of the display device 50. In this manner, the list of suitable states is limited in relation to the object and strategy (see below) to the relevant states. The machine operator now selects a particular machining state from this limited list of suitable machining states. This can be unexpected, e.g., the machining state "completed," even though the machining subordinate to the process group is still in the "in process" state. The machining state "in process" can be preselected by the allocation device 40 and displayed accordingly on the display device 50 (e.g., by prominent colors, etc.).

If the machining group is set to machining status "in process," then the allocation unit 40 assigns to each hierarchically higher-order machining object either a selection by technically sensible machining states in the form of a list and displays it in an additional window of the display unit 50, or directs the machining objects independently to a particular machining state and displays it as needed. In the first case the machine operator now selects from the selection list the desired machining state by means of the input unit 60 of the graphical interface. In the second case, the allocation device 40 would likewise assign the machining state "to be executed" to the higher-order workpiece "WST."

Depending on the requirements and complexity of overall machining operation, individual machining objects can be "skipped." This is always useful when the process conditions at different administrative levels of the EDM machine are precisely the same and thus even random allocations of machining states for the corresponding machining objects need not be differentiated.

The hierarchial structure proposed here is decidedly useful in order to ensure a rapid and efficient set-up of an EDM machine and on the other hand, to ensure an equally efficient administration of the machining object stored in the control device 10 with associated machining states. In this manner, the state of the art sequential control program to determine the individual machining steps will be eliminated.

The overall machining operation can be started at any time when the machining object currently in work has been unambiguously and completely described. In this case it is not necessary to describe fully the machining object at the top level in the hierarchy. Rather, the overall machining operation can be started for each machining object subordinated in the hierarchy after its complete description.

If a wire break recurs, for example during the overall machining operation at a particular work step "AS," then the machining state of this work step "AS" is set to "aborted" and control skips to the next work step "AS" or the like. The control device 10 then conducts the next work step "AS" or stops the overall machining operation if all machining objects are in the "ended" or "aborted" state. For instance, if all machining objects of a workpiece "WST" are in the "ended" state, then also the state of the workpiece will be set to the "ended" state. However, if one work step "AS" is in the "interrupted" state, then the state of the workpiece "WST" will likewise be set to the "aborted" state. Subsequently, the operator later recognizes which workpieces "WST" were entirely machined and which ones still require additional machining. In this regard he checks hierarchically the states of all operations and finds the machining operations which have led to the problem. For these operations he can subsequently change the technology parameters, etc., and subsequently set their state manually from "aborted" to "to do" or possibly even to "ended," if the machining is not technically possible or is simply no longer desired. The control device 10 then changes the states of all higher order machining objects in the hierarchy likewise from the "aborted" state to the "to do" state. Then if the operator restarts an overall machining operation anew, then the control device 10 merely carries out the same processes which were not yet completed.

Also, the operator can change the state of individual machining objects at any time during the machining, for example, he can set to the state "ended" when this machining is no longer desired, or vice versa, if the quality can be improved by repeated execution of the machining, for instance. These changes can be made retroactive at any time by the operator, and the control device 10 automatically changes the states of all higher-order machining objects accordingly. If the overall machining operation is completed, the operator can now discern easily—owing to the display device 50—which work steps "AS" etc. have not yet been carried out. The entire program need not be rewritten for all accesses, i.e., neither the original program is changed nor is a new program prepared.

Frequently stamps or dies are cut out on erosive cutting machines, so that so-called dropout pieces are produced. The dropout pieces must be attached to the workpiece at a particular moment in time. Thus the machining state of a work step "AS" is divided into a long cut (full cut) and a short cut (separating cut), for example, for cutting out the contour of a stamp and/or of a die. In the long cut, the contour is only cut out to the extent that a small bar connects the workpiece with the cut-out stamp or dropout piece. After the long cut, the dropout piece is fastened. Next comes the short cut in which the remaining web is separated. Subsequently, the produced dropout piece is removed.

As a rule, the dropout pieces are removed from the workpiece during the machining, so that, for example, finishing cuts etc. can be carried out along the long cut path, wherein any attachment means can represent an obstacle. Thus the dropout piece is also treated as machining object with various possible machining states (see FIG. 3). If the machining state of a dropout piece is at "calculated not existent," then the control device 10 independently calculates, based on the input cut data of the contour to be cut, that under these circumstances no dropout piece can be produced. This will be explained below based on one example:

On a workpiece, a machining operation "ARB" is to be conducted, consisting of a workstep "AS", whereby a dropout piece is cut out. The control device 10 thus automatically recognizes (also manually programmable by the user) based on the cut to be carried out, that a dropout piece is being produced and sets the state of the dropout piece to "existent," and that of the workstep "AS" to "to do, long." Then the control device 10 conducts the long cut and changes the state of the workstep "AS" to "ended long."

Next, the control device 10 stops and prompts the operator to fasten the dropout piece. Once the dropout piece is fixed, the user manually changes the state of the dropout piece from "exists" to "fastened." Subsequently, the user causes the control device 10 to continue the machining. The control device 10 offers the user the state "to do" for this work step "AS". If the operator selects this case and starts the overall machining operation anew, then the control device 10 carries out the short cut and sets the state of the workstep "AS" to "ended short." Next, the control device stops the machining again and prompts the operator to remove the dropout piece. Once the dropout piece is removed, the operator manually changes the state of the dropout piece from "fixed" to "removed." Then any additional, analogous, work steps "AS" can follow in the form of finishing cuts. If the control device 10 determines at the beginning of machining, that no dropout piece is produced, then it sets the state of the supposed dropout piece to "calculated not existent." The operator can also input this manually.

In machine tools such as erosive cutting machines with an automatic dropout piece fastening and/or removal, the above-mentioned manual activities can be performed automatically, at least in part. The control device 10 thus is informed of the particular change in state of the dropout piece from the device for automatic dropout piece fastening and/or removal.

After every intervention by the operator it is exceptionally important that the manually input change of state also correspond to the actual state. For example, the state of the dropout piece may not be set to the state "removed" when the dropout piece produced in the machining has not yet been removed. Therefore, the control device 10 contains certain rules so that it can check the validity of any change in state caused by the operator. If the control device 10 determines, for example, that an impermissible change of state is being requested, it can then so inform the operator and stop the overall machining operation. But the control device 10 can modify its list at suitable machining states for a machining object according to these rules so that the operator cannot request any impermissible change in state. For example, he can select only from a particular list of states for a machining object if the list was prepared by the control device 10 under consideration of all rules.

We shall explain below, based on several examples, which changes in state are possible during the machining, what effects they have and what conditions must be satisfied.

For the machining objects workpiece "WST," machining group "GRU" and machining "ARB" the operator can change the state from "in process" to "ended." Thus the allocation unit 40 likewise changes the state of each subordinate machining object to the state "Ended" or "removed" for a dropout piece (perhaps the states are not changed, so that the operator can continue to know what processes have not yet been completed). The allocation unit 40 also changes the state of the higher order machining object to the "ended" state in the event that all ancillary machining objects are likewise in the "ended" state. This continues in the hierarchy of machining objects until the top level is reached.

Analogously, the allocation device 40 also changes all states of the subordinate and higher order machining objects when the operator changes the state of a workpiece "WST", of a machining group "GRU" or of a process operation "ARB" from "Ended" to "In process."

If the operator changes the state of a work step "AS" from "in process, long" to "to do, short," then the state of the associated dropout piece must be either in the state "existent" or "removed," the work step "AS" must be a full cut, a finishing cut of a die with preceding workstep "AS" whose state is "to do, long" or "Aborted, long," or a finishing cut of a stamp with preceding workstep "AS" whose state is "to do, short." Otherwise, this change in state is not possible. But the change in state has no effect on other machining objects.

If the operator changes the state of a work step "AS" from "to do, long" to "Completed," then the work step "AS" must not pertain to the cutting out of a stamp; the work step "AS" must be a full cut of a die with a dropout piece, whose state is "does not exist" or "not existent (calculated)," or a finishing cut of a die with preceding work step "AS" whose state is "Ended," and with a dropout piece whose state is "existent" or "fixed." Otherwise this change in state is not possible. The change in state affects the higher order machining objects if it affects the last completed work step of this administrative level.

The overall machining operation sequence is obtained under consideration of the following criteria: The state of the machining operations, selected process strategies, programmed actions, assigned priorities and perhaps additional parameters. This is indicated in FIG. 2 by the machining strategy "early" for the machine table "TIS" and the priority assignment "prio: 1" for the machining operation, "ARB" and "prio:2" for the workgroup "GRU."

In addition, a distinction can be made between process strategies for individual administrative levels, for example for a workpiece "WST" and for a workpiece group "WSG." The individual strategies are thus hierarchically arranged like the machining objects and thus can also affect each other. The strategy for a workpiece group "WSG" is set at a higher order than the strategy for a workpiece "WST", so that during machining of this workpiece "WST," the strategy for the workpiece "WST" and in addition, the strategy for the higher order workpiece group "WSG" is taken into account (unless the strategy involves the tool group such that each workpiece is to be treated solely according to its own, separate strategy).

We will use the example of an erosive cutting machine to explain below several process strategies for workpieces "WST," namely the machining strategies "early," "late," "workpiece," "work step" and "early Workpiece" or "late workpiece:"

In the "early" machining strategy we are trying to concentrate all cutting steps at the earliest possible timepoint during the overall machining operation when the operator can perform all activities (attachment or removal of the dropout piece). The course of overall machining operation can thus appear as follows:

first, all long cuts for dies and stamps, then attachment of the dropout pieces then all separator cuts then removal of the dropout pieces then all finishing cuts and other cuts without dropout pieces.

In the "late" machining strategy the individual cuts are arranged chronologically so that the operator must perform all manual operations as late as possible. The course of an overall process can thus appear as follows:

first, all full and finishing cuts of dies without dropout pieces then all full cuts and finishing cuts of dies and stamp with dropout pieces then attachment of the dropout pieces, then all separator cuts and then, removal of all dropout pieces finally, all finishing cuts.

In the "Workpiece" machining strategy, the process sequence is determined by the priorities assigned to the individual machining objects, and first the workpiece "WST" with the highest priority, whose process group "GRU" is performed with the highest priority, and whose machining operation "ARB" is performed with the highest priority. If the machining strategy for the workpiece "WST" is not explicitly linked to a machining strategy for the individual machining "ARB," then the control device 10 can assign the machining operation "ARB" internally to a preferred strategy, for example, the "Early" strategy. If two machining operations "ARB" have the same priority, then they will also be executed at the same time.

In the "workstep" machining strategy a so-called machining sequence generator is used. The priorities for the individual long and short cuts of a work step "AS" are determined automatically or by the operator and input. Next, the workstep "AS" with the highest priority is carried out.

In the "early workpiece" or "late workpiece" machining strategy, the machining of the workpiece is conducted with the "early" or "late" machining strategy. The remaining work steps not subordinate to the workpiece are then handled in the sequence of their assigned priorities. For example, if a workpiece was machined with the "early" strategy and then two additional worksteps "AS" with differing priority remain, then first the workstep "AS" with the higher priority is handled.

For workpiece groups "WSG" in addition to the aforesaid process strategies for workpieces "WST" there are the additional "workpiece" and "All workpieces" strategies.

In the "workpiece" strategy, first the workpiece "WST" with the highest priority is handled, and specifically with the machining strategy for this workpiece "WST." If the entire machining operation of this workpiece "WST" is completed (plus dropout piece fastening and removal), then the next workpiece "WST" is machined.

In the "All workpieces" strategy, first the workpiece "WST: with the highest priority is handled, and specifically with the machining strategy for this workpiece "WST." At that point of the machining where the operator would have to intervene for the machining of this workpiece (dropout pieces, etc.), the overall machining operation is not interrupted, but rather the next workpiece "WST" is handled according to assigned priority. This is continued for all workpieces of the workpiece group, until nothing more can be done without intervention by the operator.

We claim:

1. A method for controlling the entire machining operation of machine tools, wherein at least parts of the machining operation are related to multiple machining objects, the machining objects including at least a workpiece and a workstep, and wherein the machining state of each machining object can be described from a list of suitable machining states for the machining object, said method comprising the steps of:

a. providing a control device comprising a memory management device for managing the entire machining operation in the form of individual machining objects, a monitoring device for monitoring the current machining state of a machining object, and a display device for displaying the current machining state of a machining object;

b. monitoring the current machining state of each machining object;

c. selecting a machining object;

d. changing the machining state of the selected machining object to a different machining state chosen from the list of suitable machining states for the selected machining object;

e. identifying incompatible machining states of the machining objects not selected; and f. adapting the machining states of the machining objects not selected to eliminate the identified incompatible machining states.

2. Method according to claim 1, characterized in that the machining objects are subdivided hierarchically.

3. Method according to claim 2, characterized in that the machining state of a machining object is affected by the state of a hierarchically subordinate machining object.

4. Method according to claim 1, characterized in that the list of suitable machining states for each machining object is an open list that can be supplemented as desired.

5. Method according to 1, characterized in that after selection of a particular machining object, a list of suitable states is displayed.

6. Method according to claim 1 characterized in that the machining objects include:

an EDM machine ("WZM")

a tool table ("TIS")

a pallet ("PAL") and/or a workpiece group ("WSG")

a workpiece ("WST")

a process group ("GRU")

a machining step ("AS")

a dropout piece ("AUS")

a tool group ("WZG")

a tool ("WZ"), and/or a reference point ("BPKT").

* * * * *